(12) United States Patent
Date

(10) Patent No.: US 7,016,984 B2
(45) Date of Patent: Mar. 21, 2006

(54) SYSTEM CONTROLLER USING PLURAL CPU'S

(75) Inventor: Atsushi Date, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 10/670,302

(22) Filed: Sep. 26, 2003

(65) Prior Publication Data

US 2004/0117516 A1 Jun. 17, 2004

(30) Foreign Application Priority Data

Sep. 30, 2002 (JP) ............................. 2002-286050

(51) Int. Cl.
*G06F 3/00* (2006.01)
(52) U.S. Cl. ............................. 710/6; 710/48; 710/59; 710/100; 712/29; 712/225; 712/245
(58) Field of Classification Search ............ 712/29–34, 712/225, 245; 710/22–25, 100–1, 308, 5–7, 710/29–35, 48–50, 58–60, 71, 309; 709/247; 711/100, 151; 345/505
See application file for complete search history.

(56) References Cited

U.S. PATENT DOCUMENTS

| 4,958,273 | A | * | 9/1990 | Anderson et al. ............. 712/29 |
| 5,890,007 | A | * | 3/1999 | Zinguuzi ....................... 712/6 |
| 6,178,493 | B1 | * | 1/2001 | Lenk et al. ................... 712/28 |
| 6,611,908 | B1 | * | 8/2003 | Lentz et al. .................. 712/29 |
| 2003/0037224 | A1 | * | 2/2003 | Oehler et al. ................. 712/29 |
| 2003/0115392 | A1 | | 6/2003 | Fujiwara et al. ............ 710/113 |

* cited by examiner

*Primary Examiner*—Christopher Shin
(74) *Attorney, Agent, or Firm*—Fitzpatrick, Cella, Harper & Scinto

(57) ABSTRACT

In a system controller in which a plurality of CPUs connected through a shared bus are connected to a plurality of memory units or IO devices through a bus for separate transfer of a read instruction from a read data return, a CPU which has issued a new instruction and the destination of the instruction, and a CPU which has issued an instruction being suspended and the destination of the instruction are held, the issue order of the return data and the transfer instruction is maintained based on the held contents in a read time, and transfers, which are first serialized and transferred through the shared bus, are issued in parallel using a plurality of connection paths. Thus, the performance of the system controller using a plurality of CPUs can be successfully improved.

5 Claims, 15 Drawing Sheets

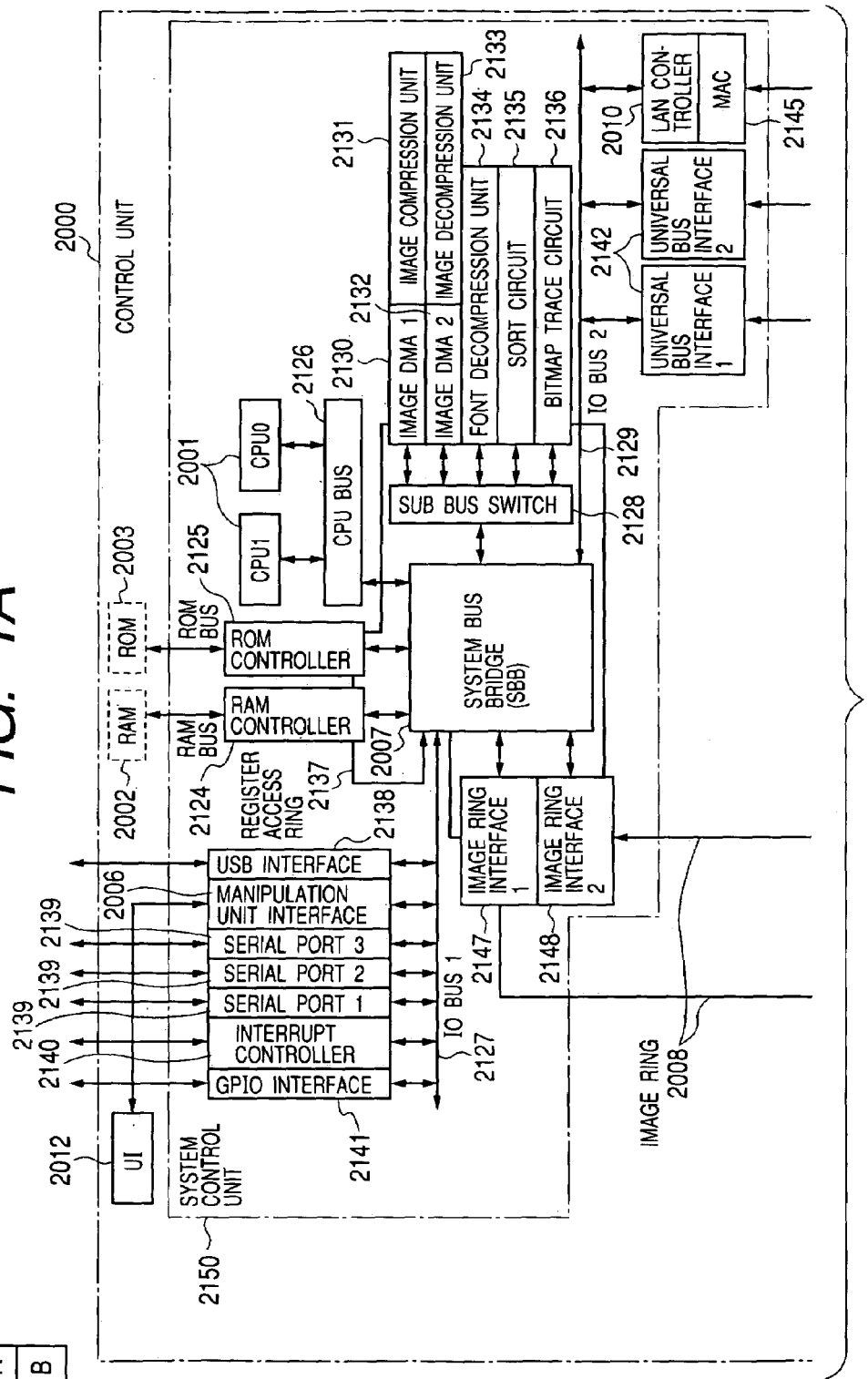

FIG. 6

| Transaction Type | Description | |
|---|---|---|
| Non-cached Instruction Read | Single read | |
| cached Instruction Read | 4 beat burst read | Critical word first (CWF) |
| Non-cached Load Data Read | Single read | |
| cached Load Data Read | 4 beat burst read | CWF |
| Store Data Write | Single write | |
| Store Data Write Burst | 4 beat burst write | CWF |

FIG. 7

| LAST SOURCE | LAST TARGET | CURRENT SOURCE | CURRENT TARGET | ISSUE PERMISSION |
|---|---|---|---|---|
| CPU0 | IO A | CPU0 | IO A | ○ |
| CPU0 | IO A | CPU0 | OTHER THAN IO A | × |
| CPU0 | IO A | CPU0 | MEM | × |
| CPU0 | IO A | CPU1 | IO A | ○ |
| CPU0 | IO A | CPU1 | OTHER THAN IO A | × |
| CPU0 | IO A | CPU1 | MEM | ○ |
| CPU0 | MEM | CPU0 | IO | × |
| CPU0 | MEM | CPU0 | MEM | ○ |
| CPU0 | MEM | CPU1 | IO | ○ |
| CPU0 | MEM | CPU1 | MEM | ○ |
| CPU1 (INVERSE AS WELL) | | | | |

TO FIG. 11B

FROM FIG. 11A

SYSTEM CONTROLLER USING PLURAL CPU'S

BACKGROUND OF THE INVENTION

1. Field of the Invention

The present invention relates to a system controller including a plurality of CPUs connected through a bus using a cross bar switch, and more specifically to a controller of a multi function peripheral with the view of controlling a scanning device, a printing device, a network interface, etc.

2. Related Background Art (1) Conventionally, there has been a multiprocessor system in which a plurality of CPUs 2001, a memory controller, a DMAC, etc. are connected to a common bus 2126 as shown in FIG. 12.

(2) There has also been a system in which a plurality of CPUs are connected to the master ports of a plurality of concurrently connectable bus switches.

(3) Furthermore, there has been a suggested configuration in which a common bus is connected to one of the master ports of the bus switches.

However, there have been the following problems with the above-mentioned conventional technologies.

In the conventional technology (1) above, it is easy to perform coherency management of cache memory by bus snooping, to realize an atomic transaction, etc., but the master device connected to the common bus can be used only one at a time. Additionally, when there are a number of devices connected to a common bus, a high-performance operation is difficult due to a limit to an operation frequency, etc.

In the conventional technology (2) above, a high-performance operation can be realized by a possible concurrent connection and the reduction of a bus load, but a CPU cannot observe a bus transaction of another CPU, and it is hard to support the coherency management of cache memory, a load link, and a store conditional atomic transaction. To solve the problem, there is a method suggested in which one transaction of a CPU is transferred to another CPU before it is transmitted to a target slave, and cache coherence is maintained and an atomic transaction is realized through a snooping operation.

However, in this method, a writing operation is held until the completion of the snooping operation, thereby restricting the performance of the CPU. Furthermore, when a write buffer is implemented, and a first CPU is performing a writing operation, a second CPU cannot detect the writing operation until the first CPU completes it, and cannot break a link bit. Therefore, an atomic transaction cannot be guaranteed.

In the conventional technology (3) above, the above-mentioned problems can be solved, but when a first CPU connected to the common bus issues a transfer request to a low-speed device having a long access time, and a second CPU tries to access a high-speed device such as memory, etc., the access of the second CPU is held until the first CPU which issued the transfer request has completed its transfer, thereby restricting the improvement of the high performance by a plurality of CPUs.

SUMMARY OF THE INVENTION

The present invention has been developed to solve the above-mentioned problems, and aims at providing a system controller capable of realizing the coherency management of cache and an atomic transaction without reduction of the performance of CPUs.

According to one aspect, the present invention which achieves these objectives relates to a system controller in which a plurality of CPUs connected through a shared bus are connected to a plurality of memory units or IO devices through a bus for separate transfer of a read instruction from a read data return, and includes: holding means for holding a CPU which has issued a new instruction and the destination of the instruction, and a CPU which has issued an instruction being suspended and the destination of the instruction; order control means for controlling the issue order of the return data and the transfer instruction based on the held contents of the holding means in a read time; and issue means for issuing transfers, which are first serialized and transferred through the shared bus, in parallel using a plurality of connection paths.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6 shows the definition of a transfer of a bus;

FIG. 7 shows the restrictions on the issue of a read transaction;

DESCRIPTION OF THE PREFERRED EMBODIMENTS

A preferred embodiment of the present invention is described below in detail by referring to the attached drawings.

First Embodiment

<Entire Configuration>

Figure 1B:
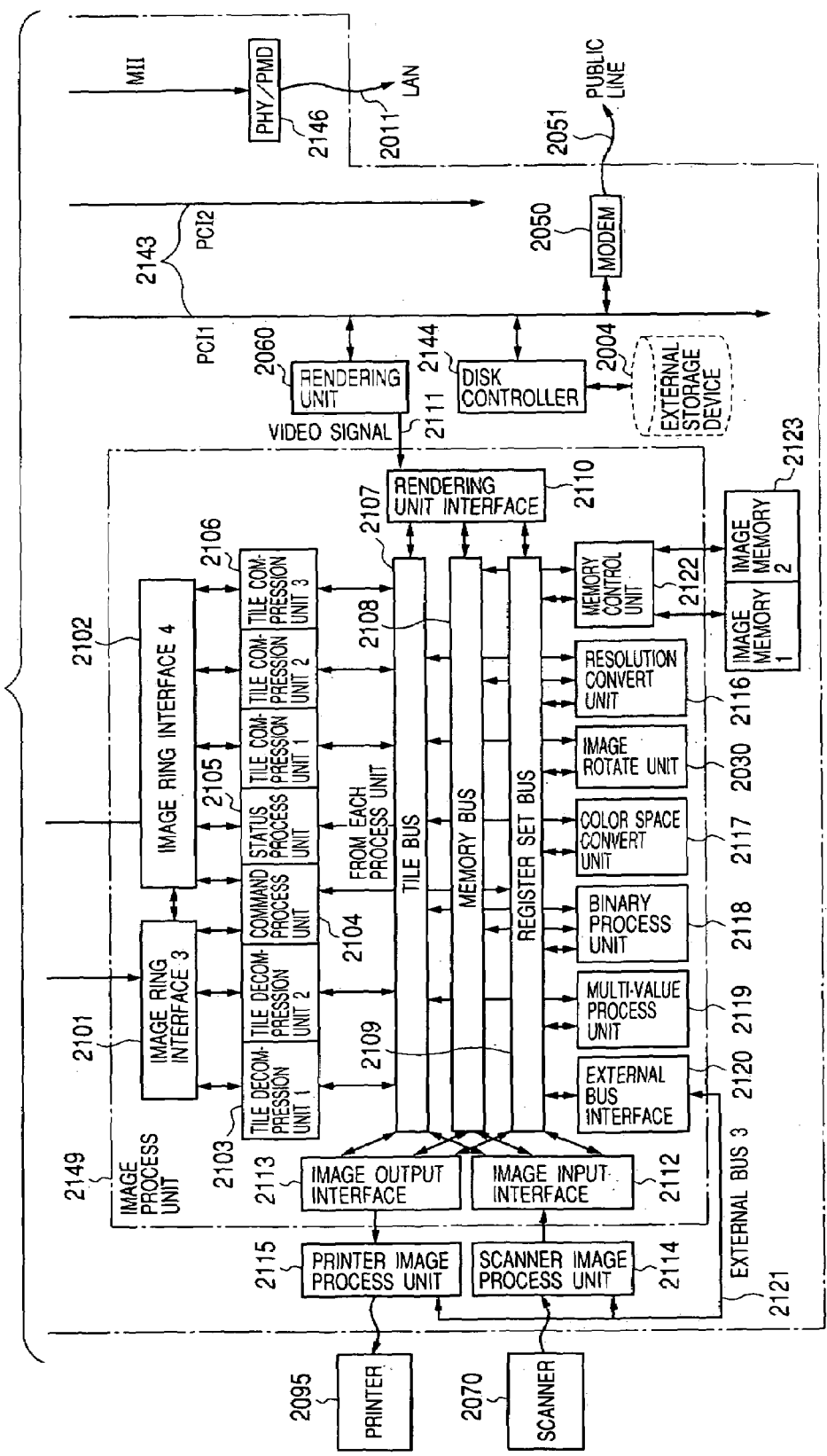
FIG. 1 is comprised of FIGS. 1A and 1B are block diagrams showing the configuration of the entire system controller according to an embodiment of the present invention.

FIGS. 1A and 1B show the entire configuration according to the first embodiment. A control unit 2000 is connected to a scanner 2070 which is an image input device and a printer 2095 which is an image output device, and is also connected to a LAN 2011 and a public line (WAN) 2051. With the configuration, the controller inputs and outputs image information and device information, develops an image of PDL data, etc.

CPU 2001 is a processor which controls the entire system. Two CPUs are used in the example according to the present embodiment. These two CPUs are connected to a common CPU bus 2126, and also to a system bus bridge 2007.

The system bus bridge 2007 is a bus switch to which the CPU bus 2126, a RAM controller 2124, a ROM controller 2125, an IO bus 1 (2127), a sub bus switch 2128, an IO bus 2 (2129), an image ring interface 1 (2147), and an image ring interface 2 (2148) are connected.

The sub bus switch 2128 is a second bus switch to which an image DMA 1 (2130), an image DMA 2 (2132), a font decompression unit 2134, a sort circuit 2135, and a bitmap trace circuit 2136 are connected, arbitrates memory access requests output from the DMAs, and realizes a connection to the system bus bridge 2007.

A RAM 2002 is system work memory for an operation of the CPU 2001, and is also image memory for temporarily storing image data. According to the present embodiment, direct RDRAM controlled by the RAM controller 2124 is used.

ROM 2003 is boot ROM, and stores a system boot program. It is controlled by the ROM controller 2125.

The image DMA 1 (2130) is connected to an image compression unit 2131, controls the image compression unit 2131 according to the information set through a register access ring 2137, reads and compresses uncompressed data in the RAM 2002, and rewrites the compressed data according to the JPEG as a compression algorithm in the present embodiment.

The image DMA 2 (2132) is connected to an image decompression unit 2133, controls the image decompression unit 2133 according to the information set through the register access ring 2137, reads and decompresses compressed data in the RAM 2002, and rewrites the decompressed data according to the JPEG as a decompression algorithm in the present embodiment.

The font decompression unit 2134 decompresses compressed font data stored in the ROM 2003 or the RAM 2002 based on the font code included in the PDL data externally transferred through the LAN controller 2010, etc. According to the present embodiment, the FBE algorithm is used.

The sort circuit 2135 rearranges the order of the objects of a display list generated at the stage of developing PDL data. The bitmap trace circuit 2136 extracts edge information from bit map data.

The IO bus 1 (2127) is a type of internal IO bus to which a USB bus controller which is a standard bud, a USB interface 2138, a universal serial port 2139, an interrupt controller 2140, and a GPIO interface 2141 are connected. The IO bus 1 includes a bus arbiter (not shown in the attached drawings).

A manipulation unit interface 2006 is an interface of a manipulation unit (UI) 2012, and outputs image data to be displayed on the manipulation unit 2012 to the manipulation unit 2012. The information input by the user of the present system from the manipulation unit 2012 is transmitted to the CPU 2001.

An IO bus 2 (2129) is a type of an internal IO bus to which a universal bus interface 1 (2142) and the LAN controller 2010 are connected. The IO bus 2 includes a bus arbiter (not shown in the attached drawings).

The universal bus interface 2142 is formed by two identical bus interfaces, and is a bus bridge for supporting a standard IO bus. According to the present embodiment, a PCI bus 2143 is used.

An HDD 2004 is a hard disk drive storing system software and image data, and is connected to one PCI bus 2143 through a disk controller 2144.

A LAN controller 2010 is connected to the LAN 2011 through a PHY/PMD circuit 2146, and inputs and outputs information.

A modem 2050 is connected to the public line 2051, and inputs and outputs information.

The image ring interface 1 2147 and the image ring interface 2 (2148) connect the system bus bridge 2007 to the image ring 2008 for transfer image data at a high speed, and function as DMA controllers for transferring data compressed after tile processing between the RAM 2002 and a tile image process unit 2149.

The image ring 2008 is formed by a pair of unidirectional connection paths (image rings 1 and 2). The image ring 2008 is connected to a tile decompression unit 2103, a command process unit 2104, a status process unit 2105, and a tile compression unit 2106 through the image ring interface 3 (2101) and an image interface 4 (2102) in the tile image process unit 2149. According to the present embodiment, two sets of tile decompression units 2103 and three sets of tile compression units 2106 are implemented.

The tile decompression unit 2103 is a bus bridge connected to an image ring interface and then to a tile bus 2107, decompresses compressed data input through an image ring, and transfers the data to the tile bus 2107. According to the present embodiment, the JPEG is adopted for multi-value data, and Packbits is adopted for binary data as decompression algorithms.

The tile compression unit 2106 is a bus bridge connected to an image ring interface and then to the tile bus 2107, compresses uncompressed data input through a tile bus, and transfers the data to the image ring 2008. According to the present embodiment, the JPEG is adopted for multi-value data, and Packbits is adopted for binary data as compression algorithms.

The command process unit 2104 is connected to an image ring interface, and then to a register set bus 2109, and writes a register set request issued by the CPU 2001 and input through an image ring to the corresponding block connected to the register set bus 2109. In response to a register read request issued from the CPU 2001, the command process unit 2104 reads information from the corresponding register through a register set bus, and transfers the information to the image interface 4 (2102).

The status process unit 2105 monitors the information about each image process unit, generates an interrupt packet for an issue of an interrupt to the CPU 2001, and outputs the packet to the image ring interface 4.

In addition to the above-mentioned block, the following function blocks are connected to the tile bus 2107. They are a rendering unit interface 2110, an image input interface 2112, an image output interface 2113, a multi-value process unit 2119, a binary process unit 2118, a color space convert unit 2117, an image rotate unit 2030, and a resolution convert unit 2116.

The rendering unit interface 2110 inputs a bit map image generated by a rendering unit described later. The rendering unit and the rendering unit interface are connected to each other through a common video signal 2111. The rendering unit interface is connected to the tile bus 2107, a memory bus 2108, and the register set bus 2109, converts in structure an input raster image into a tile image in a predetermined method set through the register set bus, simultaneously synchronizes the clocks, and outputs the image to the tile bus 2107.

The image input interface 2112 inputs raster image data which is treated in an image amending process by a scanner image process unit 2114 described later, converts in structure the image into a tile image in a predetermined method set through the register set bus, simultaneously synchronizes the clocks, and outputs the image to the tile bus 2107.

The image output interface input tile image data from a tile bus, converts in structure the image into a raster image, changes a clock rate, and outputs the raster image to a printer image process unit 2115.

The image rotate unit 2030 rotates the image data. The resolution convert unit 2116 changes the resolution of an image. The color space convert unit 2117 changes the color and the color space of a gray scale image. The binary process unit 2118 binarizes a multi-value (color, gray scale) image. A multi-value process unit 2119 converts a binary image into multi-value data.

An external bus interface 2120 is a bus bridge for converting a write or read request issued by the CPU 2001 through the image ring interfaces 1, 2, 3, and 4, a command process unit, and the register set bus, and outputting the result to an external bus 3 (2121). The external bus 3 (2121) is connected to the printer image process unit 2115 and the scanner image process unit 2114 in the present embodiment.

A memory control unit 2122 is connected to the memory bus 2108, writes and read image data to and from image memory 1 and 2 (2123) by predetermined address division at a request of each image process unit, and performs an operation such as refresh, etc. as necessary. In the example according to the present embodiment, SDRAM is used as image memory.

The scanner image process unit 2114 performs the image amending process on the image data scanned by the scanner 2070 which is an image input device.

The printer image process unit performs the image amending process for printer output, and outputs the result to the printer 2095.

A rendering unit 2060 develops a PDL code or an intermediate display list into a bit map image.

(Entire System)

Figure 2:
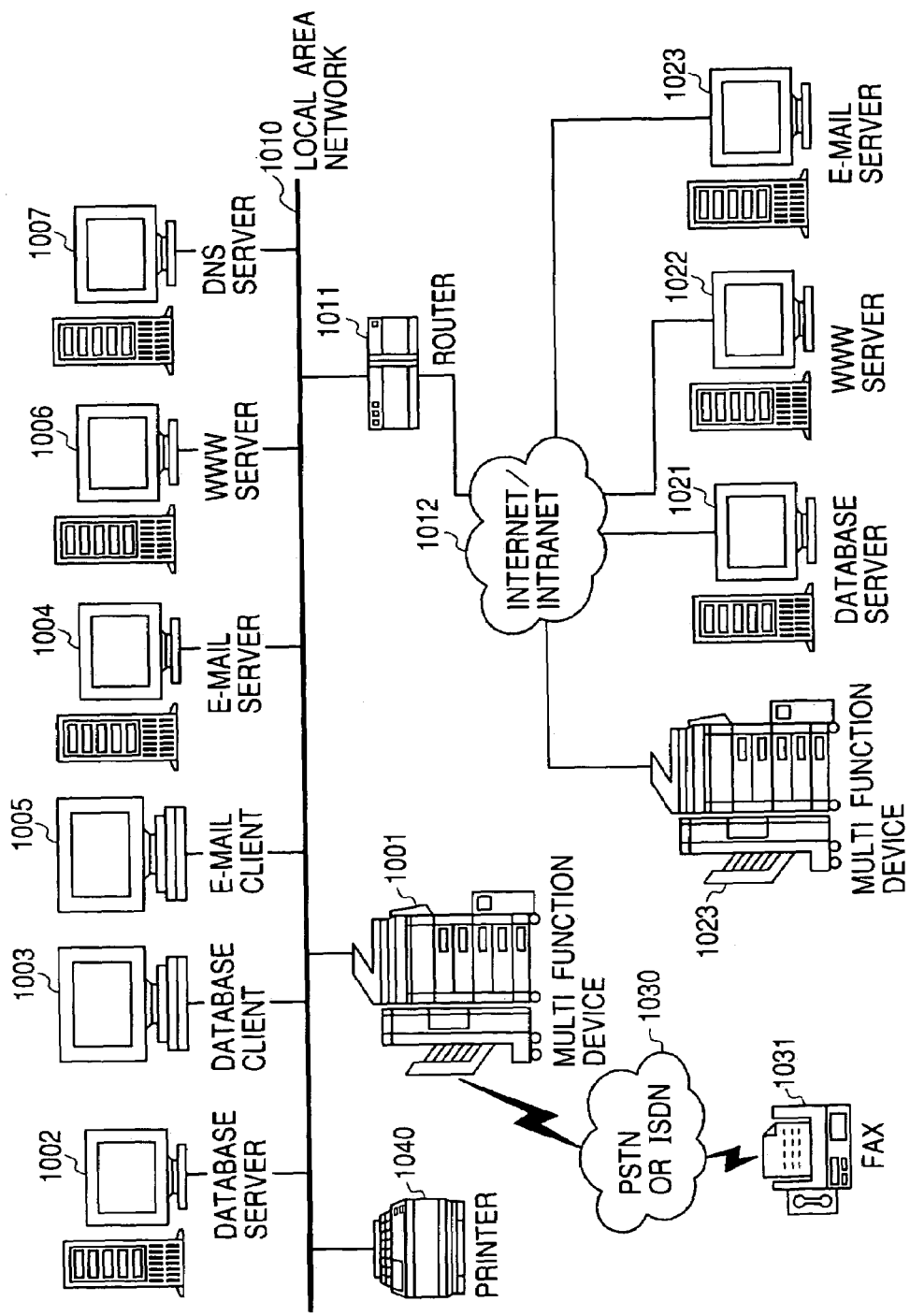
FIG. 2 shows an available environment of the system according to the present invention.

FIG. 2 shows the configuration of the entire network system according to the present embodiment.

A multi function device 1001 is formed by a scanner and a printer, can transmit an image read from the scanner to a local area network (hereinafter referred to as a LAN) 1010, and print an image received from the LAN on the printer. Furthermore, using a FAX device not shown in the attached drawings, an image read through the scanner can be transmitted to a PSTN or an ISDN 1030, or an image received from the PSTN or the ISDN can be printed on the printer. A database server 1002 manages a binary image and a multi-value image read to the multi function device 1001 in a database.

A database client 1003 is a client of the database server 1002, and can browse/retrieve image data stored in the database server 1002.

An e-mail server 1004 can receive an image read by the multi function device 1001 as an attachment to e-mail. An e-mail client 1005 can receive/browse the mail received by the e-mail server 1004, and transmit e-mail.

A WWW server 1006 provides an HTML document for the LAN. The multi function device 1001 can print the HTML document provided by the WWW server 1006.

A router 1007 connects the LAN 1010 to the Internet/intranet 1012. Connected to the Internet/intranet 1012 are the devices 1020, 1021, 1022, and 1023 similar to the above-mentioned database server 1002, the WWW server 1006, the e-mail server 1004, and the multi function device 1001. On the other hand, the multi function device 1001 can communicate with a FAX device 1031 through the PSTN or ISDN 1030.

The printer 1040 is also connected to the LAN so that an image read by the multi function device 1001 can be printed.

Figure 3:
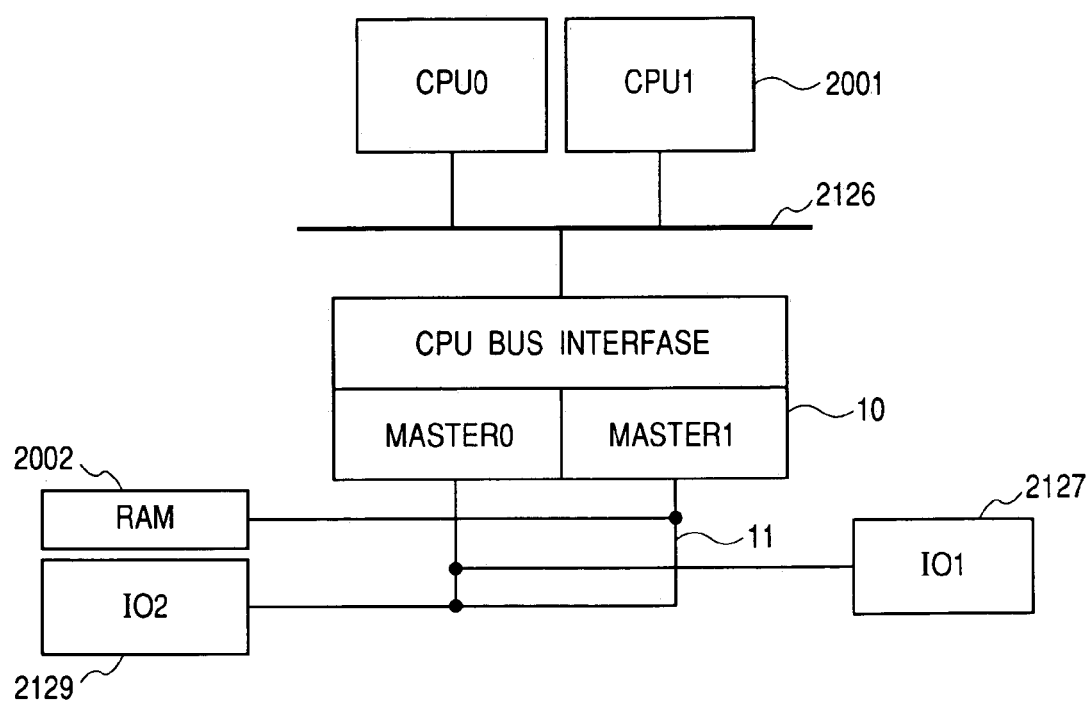
FIG. 3 shows the configuration of a bus bridge.

FIG. 3 is a block diagram of a CPU bus interface only according to the present embodiment. Two CPUs 2001 are connected to the common bus 2126. The CPU bus interface 10 implemented in the system bus bridge 2007 is connected as a slave of the common bus 2126. There are two master ports to a bus (Ybus) 11 inside the system bus bridge in the CPU bus interface. FIG. 3 shows the connection only to the RAM 2002, the IO bus 1 2127, and the IO bus 2 (2129) for simplicity.

Figure 4:
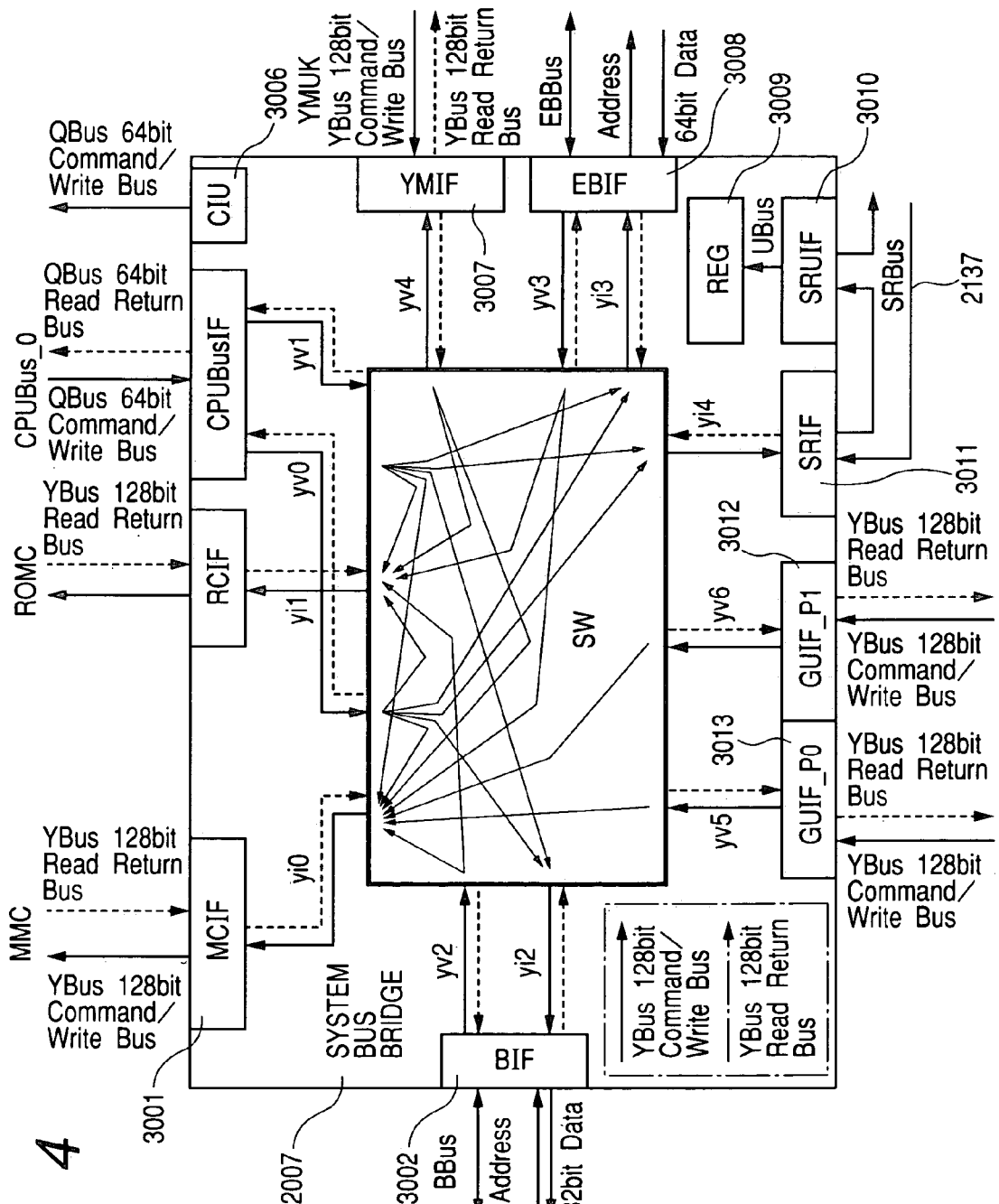
FIG. 4 shows the configuration of a system bus bridge.

FIG. 4 is a block diagram of the system bus bridge 2007.

The system bus bridge 2007 has a configuration in which a bus switch 3003 interconnects a plurality of bus interface blocks. The interconnected bus interfaces include an MCIF 3001, a BIF 3002, an RCIF 3004, a CPU bus interface 3005, a CIU 3006, a YMIF 3007, an EBIF 3008, an SRIF 3011, a GUIF_PI 3012, and a GUIF_PO 3013. An SRUIF 3010 and an REG 3009 are contained as other components.

The RAM controller 2124 is connected to the MCIF 3001. The IO bus 1 (2127) is connected to the BIF 3002. The ROM controller 2125 is connected to the RCIF 3004. The CIU 3006 is connected to the CPU bus 2126, and transmits necessary information for cache snooping to the CPU bus.

The sub bus switch 2128 is connected to the YMIF 3007. The IO bus 2 2129 is connected to the EBIF 3008. The register access ring 2137 is connected to the SRIF 3011. The image ring interface 2 (2148) is connected to the GUIF_PI 3012. The image ring interface 1 (2147) is connected to the GUIF_PO 3013. The SRUIF 3010 is connected to the register access ring 2137, and reads and writes data from and to the REG 3009.

The CPU bus interface (CPUBusIF) 3005 is the most characteristic unit in the present embodiment, and is a bus bridge for protocol conversion of the bus (Ybus) in the bus switch 3003 and the common bus 2126.

Figures 5, 5A:
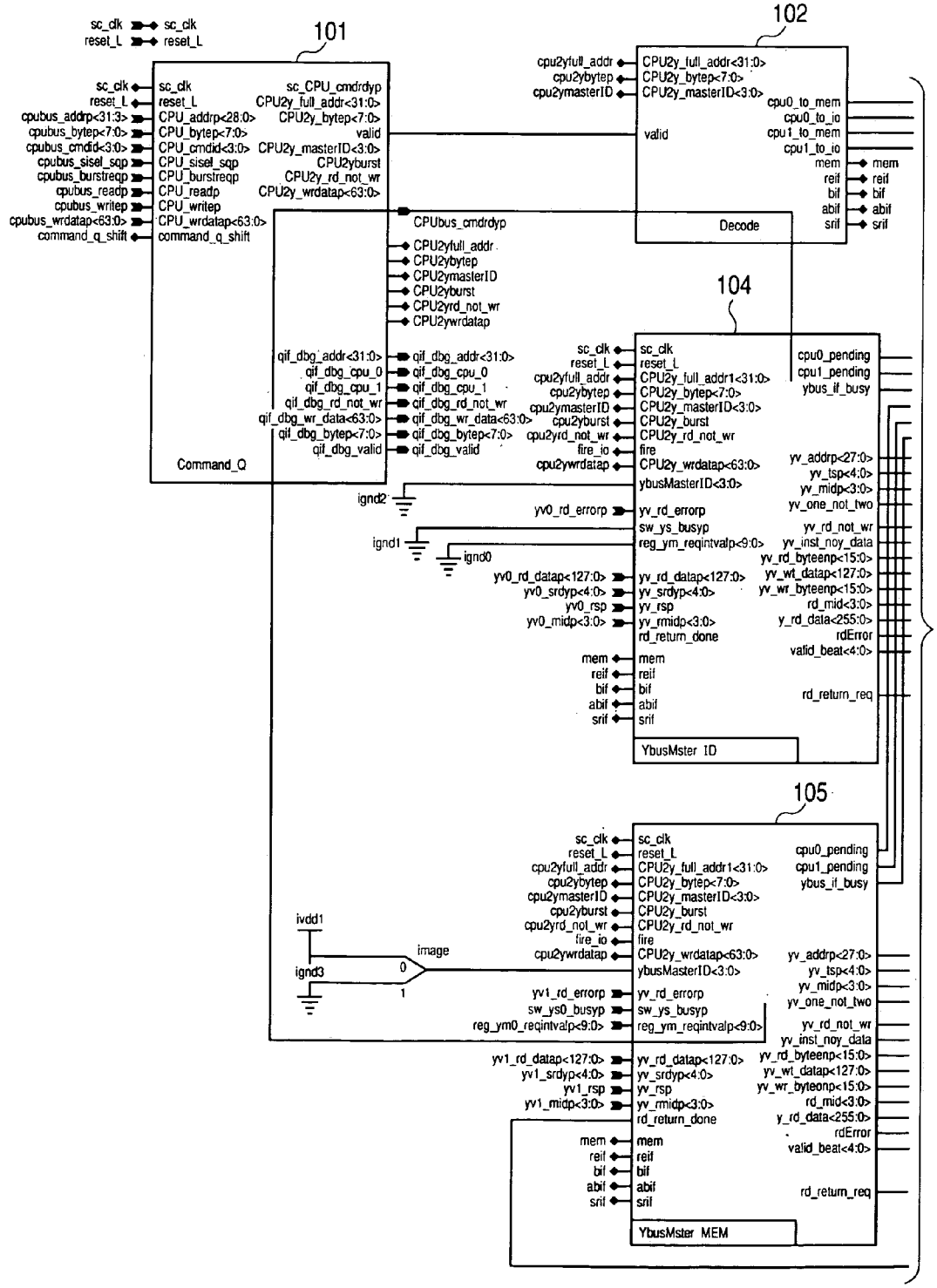
FIG. 5 is comprised of FIGS. 5A and 5B are block diagrams showing the CPU bus interface unit.
Figure 5B:
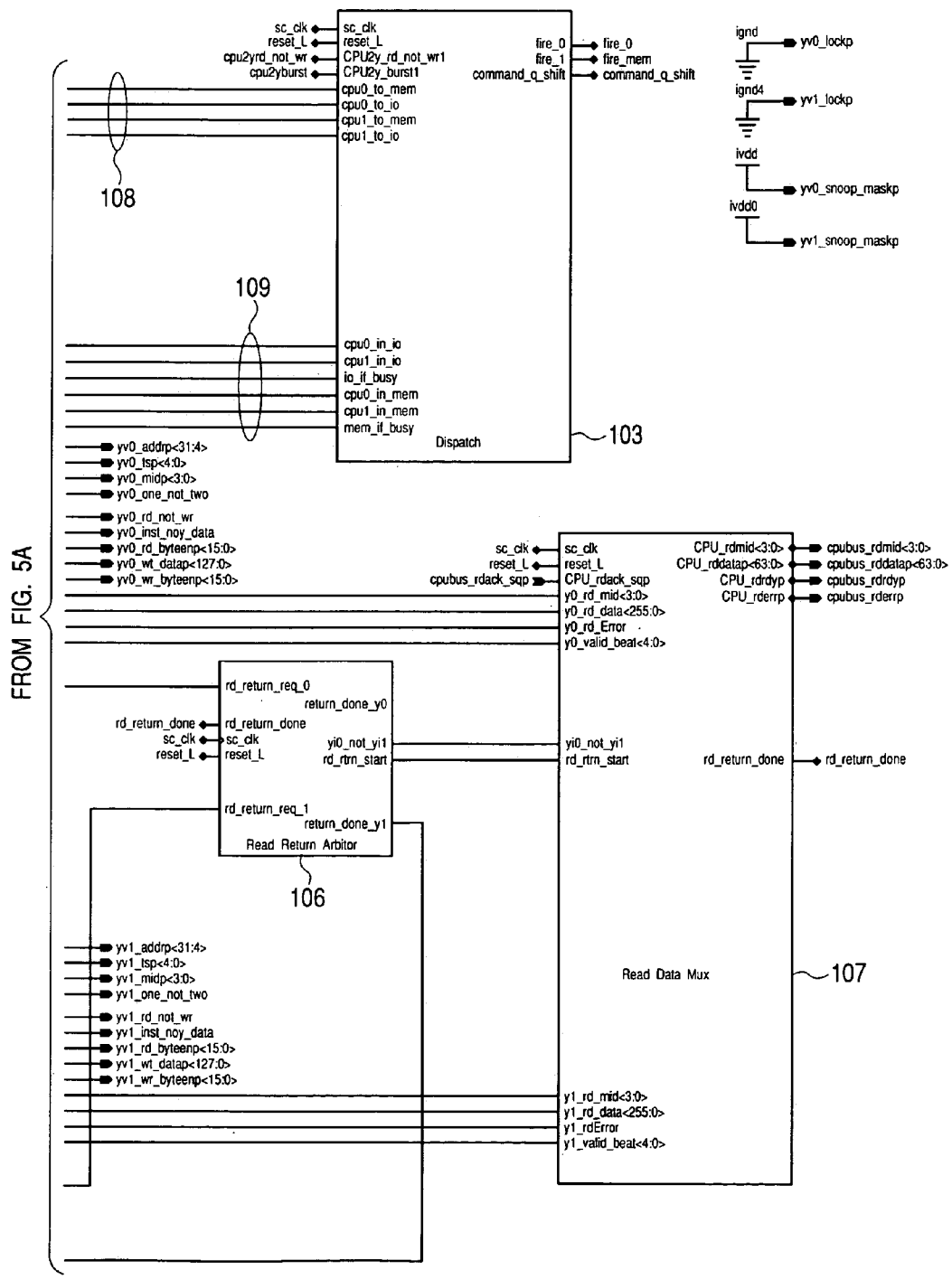

The configuration of the CPU bus interface is described below furthermore in detail. FIGS. 5A and 5B are block diagrams of the CPU bus interface.

The CPU bus interface is a bus protocol conversion circuit between the CPU bus which is an external bus interface of a CPU core and the Ybus which is an SBB internal bus. The CPU bus interface contains Command_Q 101, YbusMasterIO 104, YBusMasterMEM 105, Decode 102, Dispatch 103, ReadReturnArbitor 106, and ReadDtaMux 107.

The CPU bus interface supports the transfer shown in FIG. 6 defined in the CPU bus. The YBus master ID of the CPU bus interface is 0000 and 0001 (y0_xxx, y1_xxx).

Figure 8:
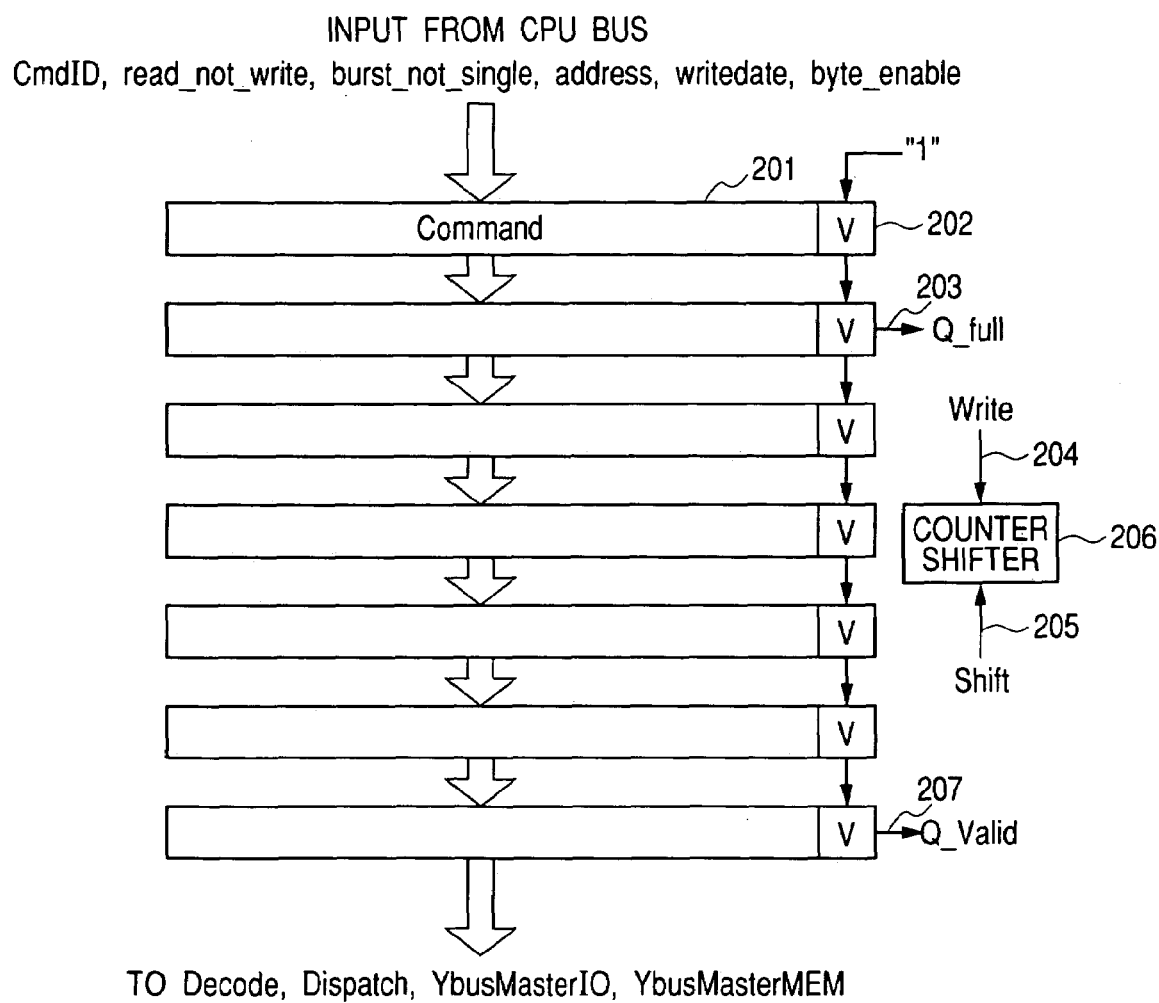
FIG. 8 shows the configuration of a command queue.

The Command_Q 101 is a queue for queuing a transaction command issued through the CPU bus. FIG. 8 is a block diagram of a command queue.

Registers 201 store a command, that is, CmdID, read_not_write, burst_not_single, address, WriteData, Byte_enable, etc. input through the CPU bus. 1 is written to a valid bit 202 when information is written, and 0 is written when a queue is shifted. A signal 203 indicates the state that Command_Q is full. It is connected to cpubus_Cmdrdyp, and stops issuing a bus transaction to the CPU 2001. A sequencer 206 for management of a queue manages a queue using a write request 204 and a shift request 205. A Q_valid signal 207 is connected to the Decode 102.

The Decode 102 is an address decoder, and performs decoding based on the output of the Command_Q 101. When the source is the CPU0 or the CPU1, the target device is memory or IO, and IO access is performed, a decoding result includes information 108 indicating any of RCIF, BIF, EBIF, and SRIF.

The Dispatch 103 determines whether or not a request to be serviced next in the Command_Q 101 can be issued to Ybus master block 104 and 105 based on the result of the Decode 102. If yes, then it issues an activate request to an appropriate Ybus master block. FIG. 7 shows the restriction on the issue of a read transaction.

Figure 9:
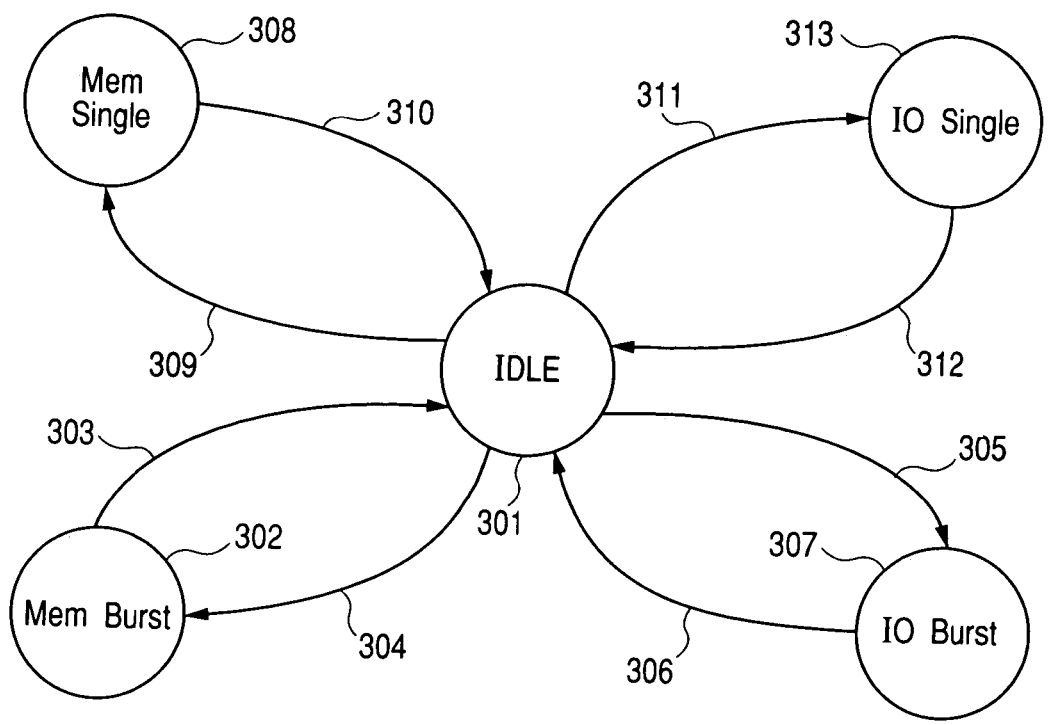
FIG. 9 shows the state transition of a day batch state machine.
Figure 10:
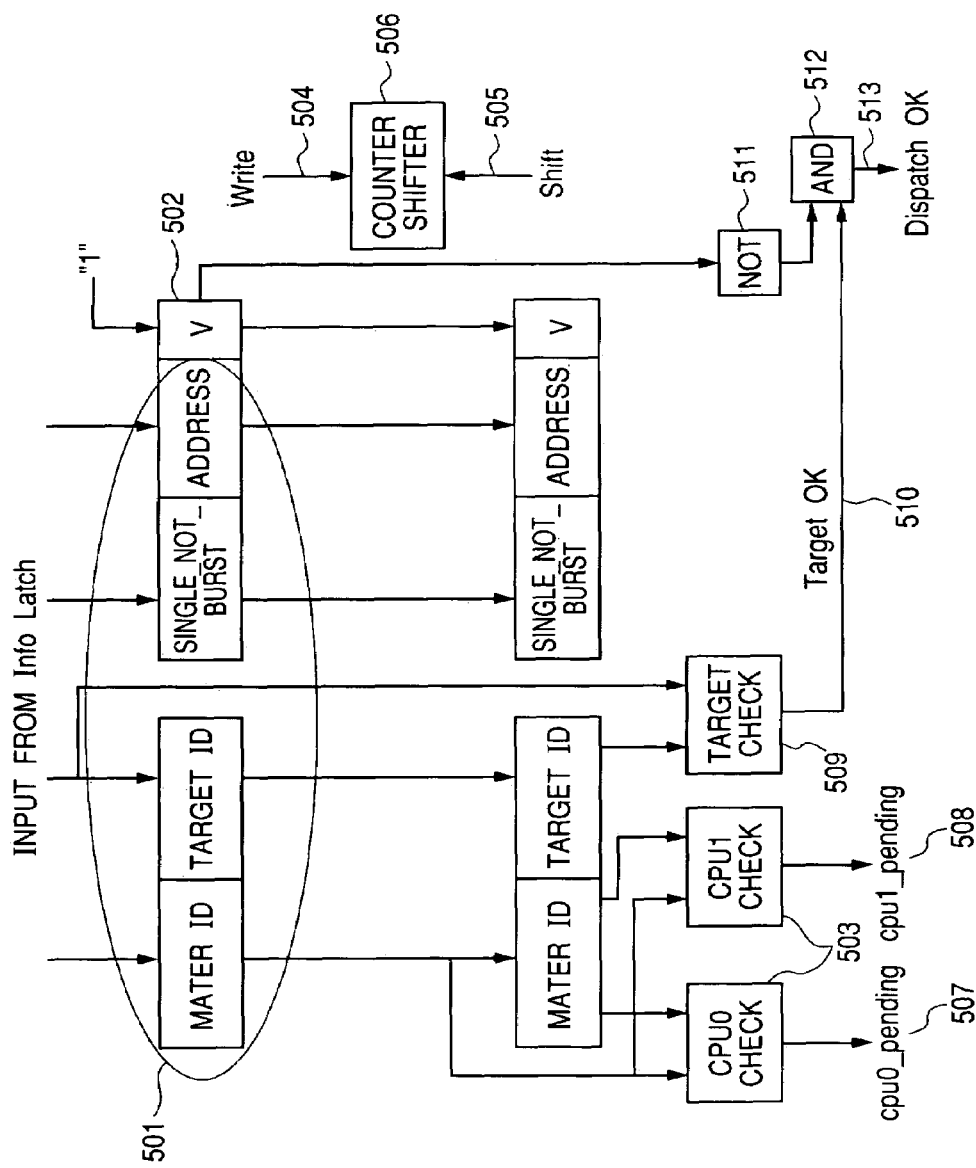
FIG. 10 shows a Ybus read pending queue.

PendingQ 403 holds the information for enforcement of the restriction item, and the Dispatch 103 makes the determination. FIG. 10 shows the configuration of the PendingQ 403, and FIG. 9 shows the state transition of the Dispatch 103. In the Dispatch 103, the sequencer is in the state of IDLE 301 when no access request is issued through the CPU bus.

When an access request from the CPU bus is queued, YbusMaster of the IO or the MEM is activated based on a holding status 109 of a read request of the CPU0 and the CPU1 output from the PendingQ 403 and CPU request information 108 output from the Decode 102 described below.

Practically, if an access request to the IO is issued from the CPU0 as shown in FIG. 7, a cpu0_in_mem (in 109) signal output from the YBusMasterMEM 105 is not active, and a single transfer request is issued, then a transition 311 passes control to the YbusMasterIO 104 for a state IOSingle 313 in which a single transfer request is issued. After the activation request to the YbusMasterIO 104, control is returned to the idle state in a transition 312. Similarly, in the case of a burst transfer, the transition 305→307→306 activates the burst transfer of IO. In the case of a read request of IO, a TargetCheck 509 in the PendingQ 403 shown in FIG. 10 checks whether or not the read request to a different IO target has already been suspended, and an actual transaction is not issued until a DispatchOK signal 513 returns data for the read request to a different target.

If the access request from the CPU0 is issued to the MEM, then it is checked by a CPU0_in_io signal whether or not the request of the CPU0 has already been suspended in the YbusMasterIO 104. If it has not been suspended, a memory access request is issued to the YBusMasterMEM 105 through 309→308→310 or 304→302→303 depending on a burst or single transfer. The YbusMasterIO 104 and the YBusMasterMEM 105 are Ybus master blocks for accessing an IO device and memory respectively. The two blocks have the same internal configurations. The YbusMasterIO 104 and the YBusMasterMEM 105 are explained by referring to the YbusMasterIO 104 for example.

Figures 11, 11A, 11B:
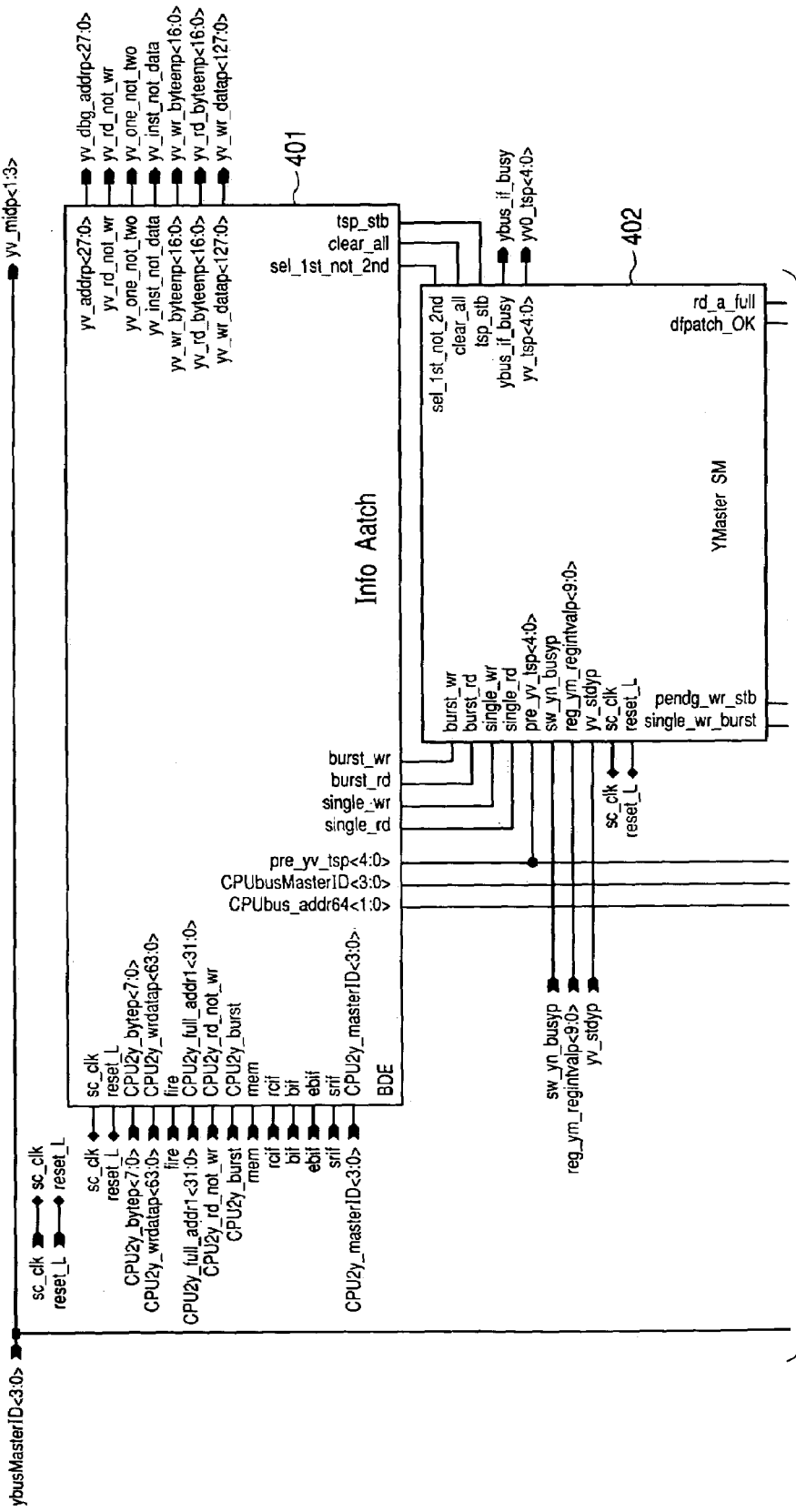
FIG. 11 is comprised of FIGS. 11A and 11B are block diagrams of a Ybus master block.
Figure 11B:
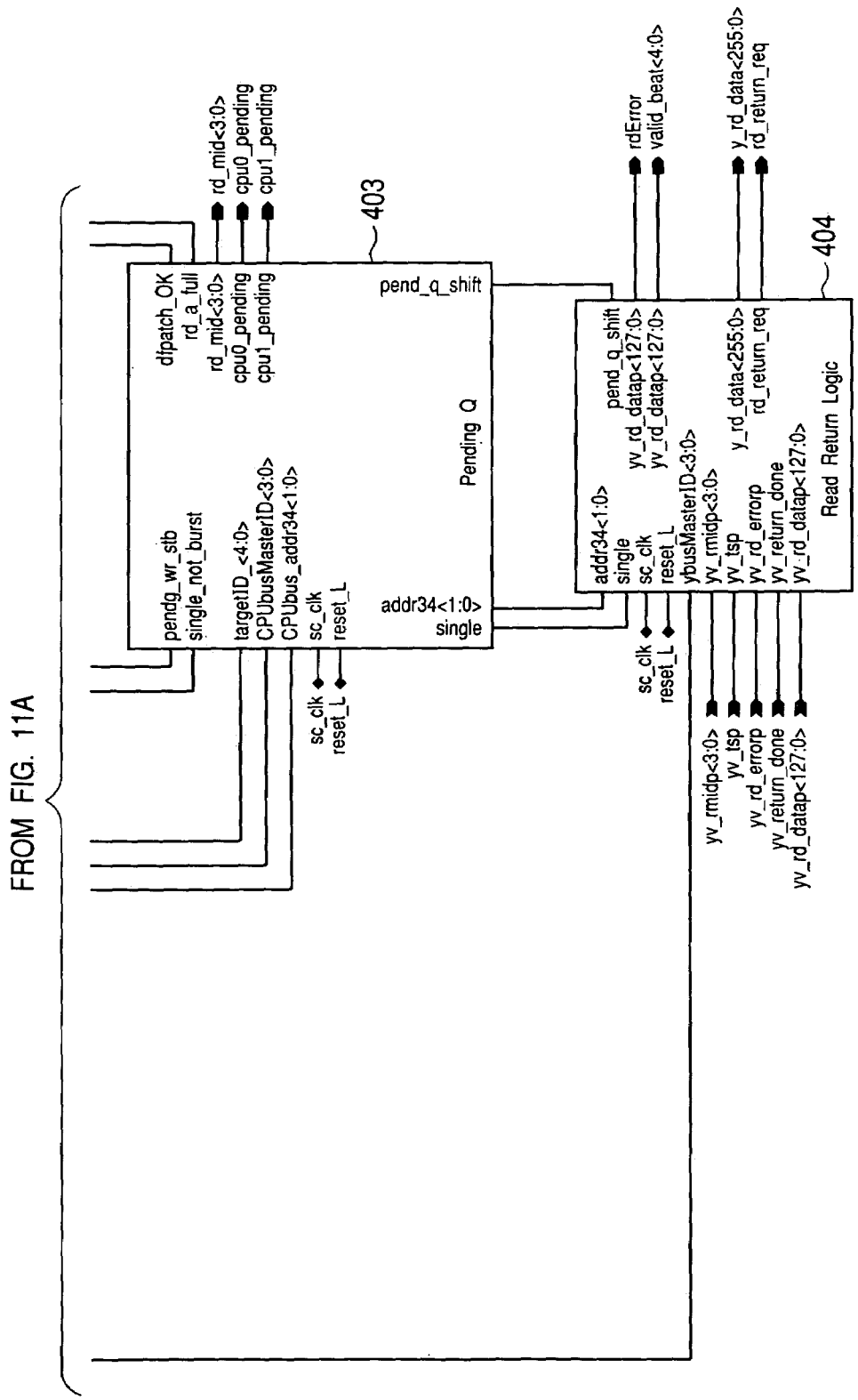
Figure 12:
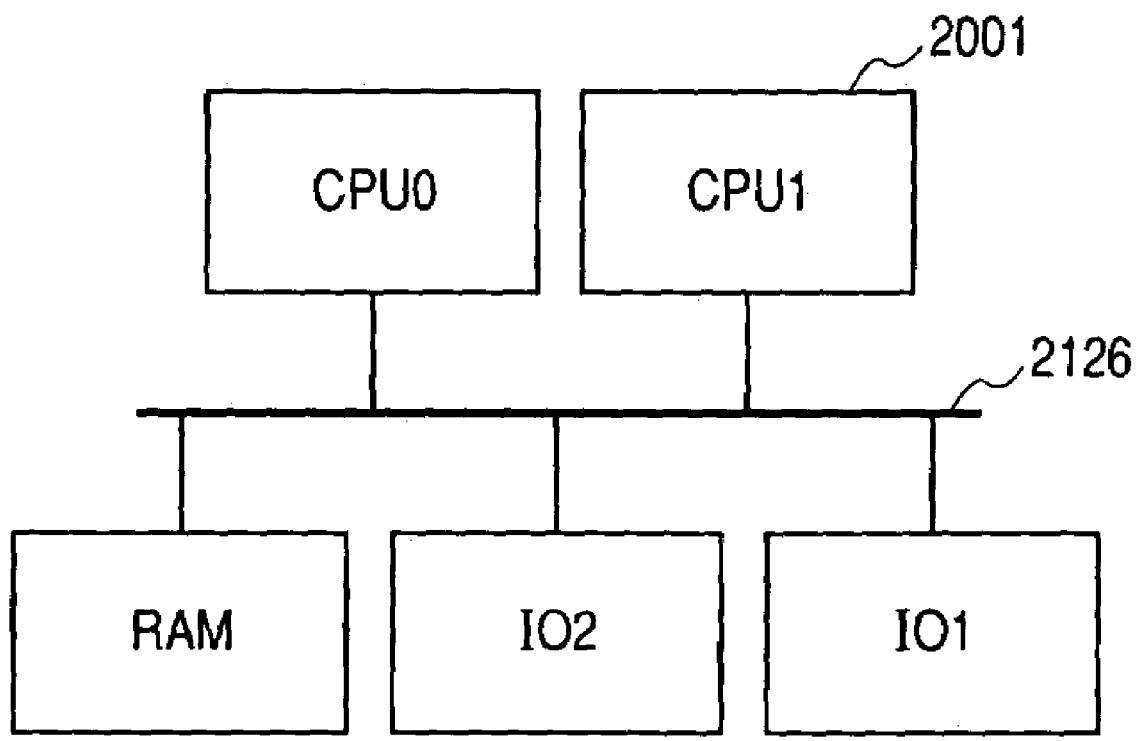
FIG. 12 shows the configuration of a conventional technology.

FIGS. 11A and 11B show an internal structure of the YbusMasterIO 104. An Info Latch 401 holds necessary information for an issue of a Ybus transaction for a necessary period at an activation request from the Dispatch 103. The information includes an address, byte enable, write data, read, write, burst transaction, single transaction, the number of a request issuing CPU, etc.

The Info Latch 401 simultaneously decodes information, and issues an activation request to a YMasterSM 402.

The YMasterSM 402 has a built-in Ybus master state machine, and issues to the Y bus a transaction request of any of single read, single write, burst read, and burst write. When the issued request is read, a read transaction is issued to the Ybus, and a PendingQ 403 is instructed to hold the information used in the read request. If the request issued to the Ybus is write, then write data is driven to the Ybus together with the control information such as an address, etc. If it is a single write, the transfer terminates, and control is returned to the idle state.

In the case of a burst write, the data at the second beat is driven on a clock cycle after a ready signal is returned from an access target device, and control is returned to the idle state. The read data returned from the Ybus is temporarily stored in a read buffer of a ReadReturnbgic 404.

Then, to transfer the returned data to the CPU 2001, a read return transaction issue request of a CPU bus is issued to the ReadReturnArbitor 106. The ReadReturnArbitor 106 arbitrates the read return request, instructs the ReadDtaMux 107 to start the read return sequence and issues a selection signal of the data to it. The ReadDtaMux drives read data to the CPU bus, and notifies the CPU of the return of ReadData using the cpubus_rdrdyp signal.

As described above, according to the present embodiment, return data is prevented from being changed in issue order relative to a transfer instruction during a read based on the held number of the CPU which issued the instruction, transfer destination, and the number of the CPU for which a transaction is being suspended. A transfer once serialized through a common bus can be issued again in parallel through a plurality of connection paths, thereby gaining the following effects.

(1) Cache coherency management by bus snooping and an atomic transaction can be realized without reducing the performance.

(2) The implementation of a command queue (write buffer) can be realized, and the CPU is released at an earlier stage, thereby improving the performance.

(3) Once serialized CPU transactions can be arranged in parallel. Therefore, a transfer of a CPU can be completed without waiting for the completion of a transfer of another CPU accessing a low-speed device, thereby avoiding the reduction of performance.

(4) The circuit of a CPU bus slave can be shared. Therefore, the circuit can be smaller than in the case in which a plurality of CPU buses are independently arranged.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A transfer controller which is connected to a plurality of CPUs and a plurality of memory devices or IO devices, said controller, comprising:

transfer means for transferring an instruction from a CPU to a destination device and for transferring read data from the destination device to the CPU when the instruction is a read instruction, the read data being transferred at time separate from the time of transferring the corresponding read instruction;

holding means for holding information associated with a CPU which issues a new instruction and information associated with a destination device of the new instruction, and for holding information associated with a CPU which issues an instruction which is suspended and information associated with a destination device of the suspended instruction; and order control means for controlling said transfer means to transfer a plurality of read data in accordance with an order of transferring the corresponding read instructions based on held contents of said holding means.

2. The transfer controller according to claim 1, wherein the plurality of CPUs are connected through a shared bus, said controller further comprising means for queuing a transaction request output to the shared bus after bus snooping through the shared bus.

3. The transfer controller according to claim 1, wherein said order control means comprises determination means for determining whether or not a transaction can be issued to a destination device in response to a read request based on the held contents of said holding means.

4. The transfer controller according to claim 3, wherein said determination means determines that the transaction cannot be issued when a destination device of a new instruction is an IO device, and a transfer of an instruction to a different IO device is suspended.

5. The transfer controller according to claim 3, wherein said determination means determines that the transaction cannot be issued when a destination device of a new instruction is a memory device, and a transfer of an instruction issued by a different CPU is suspended.

* * * * *

UNITED STATES PATENT AND TRADEMARK OFFICE
CERTIFICATE OF CORRECTION

PATENT NO. : 7,016,984 B2  Page 1 of 1
APPLICATION NO. : 10/670302
DATED : March 21, 2006
INVENTOR(S) : Atsushi Date It is certified that error appears in the above-identified patent and that said Letters Patent is hereby corrected as shown below:

ON THE TITLE PAGE, ITEM (54):
Title, "CPU'S" should read -- CPUs --.

DRAWINGS:
Sheet 12, Figure 10, "MATER ID" (both occurrences) should read -- MASTER ID --.

COLUMN 1:
Line 2, "CPU'S" should read -- CPUs --.

COLUMN 2:
Line 7, "are" should read -- is --.

COLUMN 3:
Line 52, "bud," should read -- bus, --.

COLUMN 9:
Line 10, "comprising" should read -- comprising: --.

Signed and Sealed this

Twenty-sixth Day of June, 2007

JON W. DUDAS
*Director of the United States Patent and Trademark Office*